(12) United States Patent
Bindra

(10) Patent No.: US 7,041,421 B2
(45) Date of Patent: *May 9, 2006

(54) LAKED AZO RED PIGMENT AND PROCESSES FOR PREPARATION AND USE

(75) Inventor: Amrit P. Bindra, Brecksville, OH (US)

(73) Assignee: Engelhard Corporation, Iselin, NJ (US)

( * ) Notice: Subject to any disclaimer, the term of this patent is extended or adjusted under 35 U.S.C. 154(b) by 196 days.

This patent is subject to a terminal disclaimer.

(21) Appl. No.: 10/657,484

(22) Filed: Sep. 8, 2003

(65) Prior Publication Data

US 2005/0054385 A1    Mar. 10, 2005

(51) Int. Cl.
*G03G 9/09* (2006.01)

(52) U.S. Cl. .................. 430/108.23; 106/402; 106/494; 106/496

(58) Field of Classification Search ........... 430/108.23; 106/402, 494, 496
See application file for complete search history.

(56) References Cited

U.S. PATENT DOCUMENTS

| 6,001,167 | A | 12/1999 | Bindra | |
|---|---|---|---|---|
| 6,254,671 | B1 * | 7/2001 | Hays | 106/496 |
| 6,375,733 | B1 | 4/2002 | Bindra | |

FOREIGN PATENT DOCUMENTS

| CS | 268606 | * 8/1990 |
|---|---|---|
| JP | 58-176260 | * 10/1984 |
| WO | PCT/US2004/028951 | 9/2004 |

OTHER PUBLICATIONS

Makromol. Chem. 193, 909-919.*
Chemical Abstracts Registry No. 141025-34-5.
Chemical Abstracts Registry No. 83249-60-9.
Chemical Abstracts Registry No. 73019-25-7.
Chemical Abstracts Registry No. 67990-37-8.
Chemical Abstracts Registry No. 250639-69-1.
Chemical Abstracts, vol. 52, No. 14; Jul. 25, 1958 "Synthetic and Analytic Studies on Color Reagent", XPO02304183 & Emi et al. Synthetic and Analytic Studies on Color Reagent Nippon Kagaku Zasshi, vol. 78, 1957, pp. 977-978.
Database WPI, Derwent Publications; AN 1983-823319; XPO02305471 & JP 58 174445 A Nippon Kayaku KK Oct. 13, 1983, abstract, Database WPI, Derwent Publications; AN 1983-23788K, XP002305486 & JP 58 015560A (Shiseido Co) Jan. 28, 1983 abstract.

* cited by examiner

*Primary Examiner*—John L Goodrow
(74) *Attorney, Agent, or Firm*—Melanie L. Brown

(57) ABSTRACT

Disclosed is a red pigment compound containing a pigment represented by Formula I:

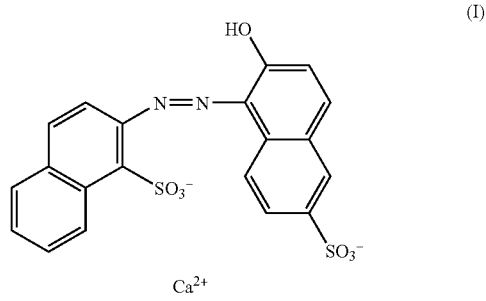

having a certain Hue Angle and Apparent Strength. Also disclosed is a method of making a red pigment composition. Further disclosures relate to coating compositions, ink compositions, plastic compositions, electrostatic toner compositions, powder coating compositions, paint compositions, and paper compositions containing the red pigment represented by Formula I.

24 Claims, No Drawings

LAKED AZO RED PIGMENT AND PROCESSES FOR PREPARATION AND USE

FIELD OF THE INVENTION

The present invention generally relates to azo red pigments which are excellent in color strength, brightness and heat stability and highly useful in plastic, coating and ink compositions. The present invention further relates to methods of making and using the azo red pigments.

BACKGROUND OF THE INVENTION

Azo pigments are a class of colorants that are adequately strong tinctorially and relatively inexpensive. Azo pigments are generally either monoazo or disazo pigments. Monoazo pigments generally exhibit good lighffastness and are useful as coloring agents for paints and some printing inks. In plastics, however, some monoazo pigments tend to undesirably bloom and discolor at high temperatures, so their use is disfavored.

Commercially available azo pigments that exhibit some heat stability commonly used in plastics are limited to the color range of yellow, orange and red colors such as Pigment Yellow 61, Pigment Yellow 62, Pigment Yellow 183, Pigment Yellow 191, Pigment Yellow 205, Pigment Yellow 206, Pigment Yellow 209, Pigment Yellow 209:1, Pigment Yellow 210, Pigment Yellow 212, Pigment Orange 79, Pigment Red 60:1, Pigment Red 276, Pigment Red 277, Pigment Violet 51 and Pigment Violet 52, etc. In near masstone shades Pigment Red 276 and Pigment Red 277 are relatively warm reds with respective hue angles of 29° and 23° whereas Pigment Violet 52 is a very blue shade red with a hue angle of 9.6°. Consequently, there remains a need in the intermediate shade range for red color pigments that show desirable performance in properties such as color strength, resistance to polar solvents, light fastness and/or heat stability. It is desirable to extend the shade range of azo red pigments to intermediate red shades.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter. The present invention provides laked monoazo red pigments with an intermediate shade range and heat stability.

One aspect of the invention relates to a red pigment composition containing a pigment represented by Formula I:

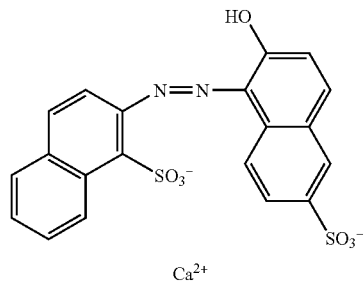

having a Hue Angle of less than 3° and an Apparent Strength K/S value of at least about 10.

Another aspect of the invention relates to a method of making a red pigment and a red pigment composition by coupling a diazonium component comprising a compound prepared from an aromatic amine represented by Formula II

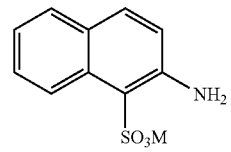

wherein M is any one of H, Li, Na, ½Mg, K, ½Ca, ½Sr, $NH_4$, $NR_{4-x}H_x$, wherein R is an alkyl or alkoxy group containing 1 to 4 carbon atoms and x is 0 to 3 with a coupling component comprising an aromatic sulfonic acid coupler represented by Formula III

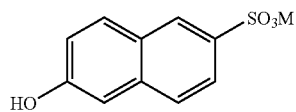

wherein M is any one of H, Li, Na, ½Mg, K, ½Ca, ½Sr, $NH_4$, $NR_{4-x}H_x$, wherein R is an alkyl or alkoxy group containing 1 to 4 carbon atoms and x is 0 to 3 at a pH of about 4 or more and about 9 or less; and metallizing the coupling product, wherein at least one of the coupling and the metallizing is conducted in the presence of a surfactant.

Yet other aspects of the invention relate to coating compositions, ink compositions, plastic compositions, electrostatic toner compositions, powder coating compositions, paint compositions, and paper compositions containing the red pigment represented by Formula I.

To the accomplishment of the foregoing and related ends, certain illustrative aspects of the invention are described herein in connection with the following description. These aspects are indicative, however, of but a few of the various ways in which the principles of the invention may be employed and the present invention is intended to include all such aspects and their equivalents. Other advantages and novel features of the invention will become apparent from the following detailed description of the invention.

DETAILED DESCRIPTION OF THE INVENTION

The present invention provides laked monoazo red pigments represented by Formula I.

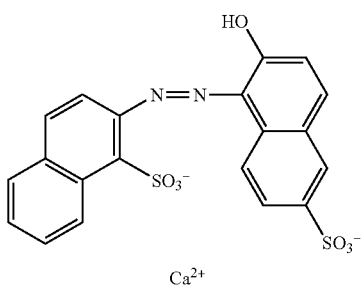

(I)

The process for preparing the laked monoazo red pigments contributes to the ability of the pigments to possess at least one of intermediate shades, strength, and heat stability. Moreover, the process for preparing the laked monoazo red pigments contributes to the unique Hue Angle and Apparent Strength of the pigments. The red azo pigment of the present invention is prepared by initially diazotizing an aromatic amine and thereafter coupling the diazonium component with a coupling component to form a dye. The dye is then laked or metallized to form the desired pigment. In at least one of the coupling and metallizing reactions, and in some instances both the coupling and metallizing reactions, a surfactant is employed.

An aromatic amine suitable for the purposes of the present invention is characterized by Formula II.

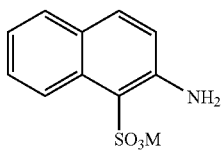

(II)

wherein M is any one of H, Li, Na, ½Mg, K, ½Ca, ½Sr, $NH_4$, $NR_{4-x}H_x$, wherein R is an alkyl or alkoxy group containing 1 to 4 carbon atoms and x is 0 to 3. Examples of compounds according to Formula II include 2-aminonaphthalene-1-sulfonic acid, sodium 2-aminonaphthalene-1-sulfonate, potassium 2-aminonaphthalene-1-sulfonate, and ammonium 2-aminonaphthalene-1-sulfonate.

In one embodiment, only one aromatic amine is diazotized and employed in the coupling reaction. In another embodiment, mixtures of two or more aromatic amines are employed in the coupling reaction. In such embodiments, at least one of the aromatic amines is represented by Formula II and the other supplemental aromatic amine(s) may be selected from 2-amino-5-methoxy-benzenesulfonic acid; 2-amino-5-ethoxy-benzenesulfonic acid, 2-amino-4-chloro-5-methoxy-benzenesulfonic acid; 2-amino-4-chloro-5-ethoxy-benzenesulfonic acid; 2-amino-4-methyl-5-methoxy-benzenesulfonic acid; 2-amino-4-ethyl-5-methoxy-benzenesulfonic acid; 2-amino-4,5-dimethoxy-benzenesulfonic acid; 2-amino-4-methyl-5-ethoxy-benzenesulfonic acid; 2-amino-4-ethyl-5-ethoxy-benzenesulfonic acid; 2-amino-4,5-diethoxy-benzenesulfonic acid; 2-aminobenzene-1-sulfonic acid; 4-aminobenzene-1-sulfonic acid; 2-amino-5-methylbenzene-1-sulfonic acid; 3-amino-6-methylbenzene-1-sulfonic acid; 2-amino-4-chloro-5-methylbenzene-1-sulfonic acid; 2-amino-5-chloro-4-ethylbenzene-1-sulfonic acid; 2-amino-5-chloro-4-methylbenzene-1-sulfonic acid; 3-aminobenzoic acid; 4-aminobenzoic acid; 2-amino-5-methylbenzoic acid; 2-amino-6-methylbenzoic acid; 3-amino-2-methylbenzoic acid; 2-amino-3-methoxybenzoic acid; 4-amino-3-methoxybenzoic acid; 4-amino-5-chloro-2-methoxybenzoic acid; 2-amino-4-chlorobenzoic acid; 3-amino-4-chlorobenzoic acid; 1-naphthyl amine; 2-naphthyl amine; 4-aminonaphthalene-1-sulfonic acid; 4-aminobiphenyl-3'-sulfonic acid; 4,4'-diaminobiphenyl-2,2'-disulfonic acid 2-methoxy-4-nitroaniline; 2-methoxy-5-nitroaniline; 4-methoxy-2-nitroaniline; 2-amino-4-chloro-5-nitrotoluene; 2-chloro-4-nitroaniline; 2-chloro-5-nitroaniline; 4-chloro-2-nitroaniline; 4-chloro-3-nitroaniline; 5-chloro-2-nitroaniline; 5-chloro-2-methyl-4-nitroaniline; 2-chloro-4-methylaniline; 2-chloro-5-methylaniline; 2-chloro-6-methylaniline; 3-chloro-2-methylaniline; 3-chloro-4-methylaniline; 4-chloro-2-methylaniline; 5-chloro-2-methylaniline; 4-chloro-2-methoxy-5-methylaniline; 4-chloro-2,6-dinitroaniline; 6-chloro-2,4-dinitroaniline; 2-chloro-4,6-dimethylaniline; 3-chloro-2,6-diethylaniline; 4-chloro-2,6-dibromoaniline; 2-chloroaniline; 3-chloroaniline; 4-chloroaniline; 5-chloro-2-methoxyaniline; 3-chloro-4-methoxyaniline; aniline; salts thereof, and the like.

The diazotization of the one or more aromatic amine may be carried out in the manners known to those skilled in the art. For example, diazotization may be carried out through the use of alkali metal nitrites or lower alkyl nitrites together with an adequately strong acid such as a mineral acid. Examples of useful mineral acids include hydrochloric acid, nitric acid, nitrosyl sulfuric acid, phosphoric acid, perchloric acid, and sulfuric acid. In one embodiment, the diazotization reaction can be conducted at a temperature in the range of from about −20° C. to +30° C. In another embodiment, the diazotization reaction can be conducted at a temperature in the range of from about 0° C. to +15° C.

Although not required, it may be advantageous in some of the diazotization reactions (and in some of the subsequent coupling reactions) to include a surface active agent such as a non-ionic, anionic, amphoteric, or cationic surface active agent and, optionally, one or more appropriate organic solvents such as, for example, glacial acetic acid, lower alkanols, dioxane, formamide, dimethyl formamide, dimethyl sulfoxide, pyridine or N-methyl pyrrolidone. The surface active agents are described below.

An aromatic sulfonic acid coupler useful for the purposes of this invention is represented by Formula III.

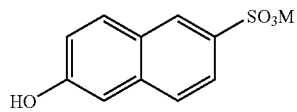
(III)

wherein M is any one of H, Li, Na, ½Mg, K, ½Ca, ½Sr, NH$_4$, NR$_{4-x}$H$_x$, wherein R is an alkyl or alkoxy group containing 1 to 4 carbon atoms and x is 0 to 3. Examples of compounds according to Formula III include 2-hydroxynaphthalene-6-sulfonic acid, sodium 2-hydroxynaphthalene-6-sulfonate, potassium 2-hydroxynaphthalene-6-sulfonate, and ammonium 2-hydroxynaphthalene-6-sulfonate.

In one embodiment, only one aromatic sulfonic acid coupler is employed in the coupling reaction. In another embodiment, mixtures of two or more aromatic sulfonic acid couplers are employed in the coupling reaction. In such embodiments, at least one of the aromatic sulfonic acid coupler is represented by Formula II and the other supplemental naphthalene coupler(s) may be selected from naphthalene; naphthalene-1-sulfonic acid; naphthalene-1,3-disulfonic acid; naphthalene-2-sulfonic acid; 2-naphthoic acid; 2-naphthol; 3-naphthol; 1-naphthoic acid; 1-hydroxynaphthalene-2,7-disulfonic acid; 3-hydroxynaphthalene-1-sulfonic acid; 2-hydroxynaphthalene-1-sulfonic acid; 5-hydroxynaphthalene-1-sulfonic acid; 1-hydroxynaphthalene-3-sulfonic acid; 1-nitronaphthalene; 1-chloronaphthalene; salts thereof, and the like.

Pigments formed during the coupling reaction that are different from Formula I, but are made with either or both of the supplemental aromatic amine and the supplemental naphthalene coupler are supplemental pigments.

The coupling reaction may be carried out by adding the diazonium component(s) to coupling component(s), or by adding the coupling component(s) to the diazonium component(s). The coupling reaction is carried out at a sufficient temperature suitable for forming the dye that is subsequently converted into the pigment/pigment composition in accordance with the present invention. In one embodiment, coupling is effected at a temperature from about −20° C. to about 80° C. In another embodiment, coupling is effected at a temperature from about 0° C. to about 40° C.

The coupling reaction is carried out at a sufficient pH suitable for forming the dye that is subsequently converted into the pigment/pigment composition in accordance with the present invention. In one embodiment, coupling is effected at a pH of about 4 or more and below about 9. In another embodiment, coupling is effected at a pH of about 5 or more and about 8 or less. In yet another embodiment, coupling is effected at a pH of about 4.5 or more and about 6 or less. In still yet another embodiment, coupling is effected at a pH of about 6 or more and about 8 or less. The pH ranges described facilitate the subsequent formation of the laked monoazo red pigments having both intermediate shades and heat stability.

In one embodiment, the coupling component is initially dissolved in a basic solution such as an aqueous alkali metal hydroxide solution and reprecipitated with a dilute acid such as acetic acid. After reprecipitation, the diazonium component(s) may be added to the reprecipitated coupling component(s).

In one embodiment, the diazonium component(s) are coupled with a slight stoichiometric excess of the coupling component. That is, one equivalent of the diazonium component(s) (total amount of all of the diazonium components) is coupled with slightly more than one equivalent of the coupling component(s). In one embodiment, the ratio of equivalents of the diazonium component(s) to the coupling component(s) is from about 0.9:1 to about 1.1:1. In another embodiment, the ratio of equivalents of the diazonium component(s) to the coupling component(s) is from about 0.95:1 to about 1:1. In yet another embodiment, the ratio of equivalents of the diazonium component(s) to the coupling component(s) is from about 0.98:1 to about 1:1.

Optionally, coupling may be carried out in the presence of a surface active agent or an organic solvent. The organic solvents are those identified above in connection with the diazotization reaction. In another embodiment, it is advantageous in the diazotization reaction and/or the coupling reaction not to include one or more organic solvents.

In some instances, use of certain surface active agents during the coupling reaction facilitates the subsequent formation of the laked monoazo red pigments having at least one of intermediate shades, strength, and heat stability. Examples of surface active agents include sulfosuccinate surfactants, amine surfactants, and specifically amine oxide surfactants and ethoxylated amine surfactants. These surfactants are known in the art, and many of these surfactants are described in McCutcheon's "Volume I: Emulsifiers and Detergents", 2001, North American Edition, published by McCutcheon's Division, The Manufacturing Confectioner Publishing Co., Glen Rock, N.J., and in particular, pp. 1–233 which describes a number of surface-active agents and is hereby incorporated by reference for the disclosure in this regard.

Amine oxide surfactants and ethoxylated amine surfactants include N,N-bis(2-hydroxyethyl)cocoalkylamine oxide, N,N-dimethylcocoalkylamine oxide, alkylamineguanidine polyoxyethanol, dimethyl (hydrogenated tallow) amine oxide, dimethylhexadecylamine oxide, bis(2-hydroxyethyl)tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide.

General and specific examples of amine oxide surfactants and ethoxylated amine surfactants include those under the trade designation Aromox available from Akzo Nobel Chemicals and specifically product designations C/12, C/12W, DMC, DMC-W, DMHT, DM16, and T/12; those under the trade designation Barlox® available from Lonza and specifically product designations C, 12 and 14; those under the trade designations Corsamine and Corsathox available from Corsicana Technologies; those under the trade designation DeThox Amine available from DeForest Enterprises and specifically product designations T, C-5, and C-15; those under the trade designation Ethox available from Ethox Chemicals; those under the trade designation Chemeen available from Chemax Performance Products and specifically product designations C, HT-2, HT-15, O-30, O-30/80, and T; those under the trade designation Ammonyx available from Stepan Company; and those under the trade designation Schercamox available from Scher Chemicals and specifically product designations C-AA, DMA, DML, DMM, and DMS.

Sulfosuccinate surfactants include disodium ethoxylated-alcohol half ester of sulfosuccinic acid, disodium ethoxylated nonylphenol half ester of sulfosuccinic acid, dicyclohexyl ester of sodium sulfosuccinic acid, disodium isodecyl sulfosuccinate, diamyl ester of sodium sulfosuccinic acid, dihexyl ester of sodium sulfosuccinic acid, sodium salt of sulfated nonylphenoxy polyethoxy ethanol, dioctyl ester of sodium sulfosuccinic acid, bis(tridecyl) ester of sodium sulfosuccinic acid, sodium dialkylsulfosuccinate, and disodium alkyl sulfosuccinate. Examples include those under the trade designation Aerosol available from Cytec Industries and specifically product designations A-102, A-103, A-196, A-268, AY, MA-801, NPES, OT, TR-70 and 501; those under the trade designation Geropon available from Rhone-Poulenc and specifically product designations SDS, SS-O and 99; and those under the trade designation Mackanate available from The McIntyre Group and specifically product designations DOS-70M5 and DOS-75.

In embodiments where surface active agents, particularly amine oxide surfactants and ethoxylated amine surfactants (collectively referred to as amine surfactants), during the coupling reaction are employed, greater flexibility in the pH is achievable. In one embodiment when surface active agents, particularly amine oxide surfactants and ethoxylated amine surfactants, are employed in the coupling reaction, coupling is effected at a pH of about 4 or more and about 9 or less. In another embodiment when surface active agents are employed in the coupling reaction, coupling is effected at a pH of about 5 or more and about 8 or less. In yet another embodiment when surface active agents are employed in the coupling reaction, coupling is effected at a pH of about 5.5 or more and below about 7.5.

In another embodiment of the present invention, the dispersibility of the pigments of the present invention can be improved by adding resin like products before, during, or after the coupling is completed. Various resin like materials can be added for this purpose, and these include for example, rosin resins, polymeric rosins, resin soap, chemically modified rosin resins, such as rosin maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulfates and carbonates, titanium dioxide or clay materials or very finely divided organic plastic materials.

Metallization is performed using a calcium salt which forms the sulfonate salt. This is also known as laking and forms a metallized pigment. The calcium salt may be a salt of at least one of calcium halides, calcium nitrate, calcium alkylates, calcium carbonates, calcium sulfates, calcium silicates, calcium titanates, calcium zirconates, and two or more of these salts. Examples of calcium salts include $CaCl_2$, $CaBr_2$, $CaF_2$, $CaI_2$, $CaSO_4$, $CaTiO_3$, $CaSiO_3$, $CaZrO_3$, $CaCO_3$, $CaWO_4$, $CaC_2O_4$, $Ca(CH_3CO_2)_2$, and $Ca(NO_3)_2$. Optionally, additional divalent metal salts may be combined with the calcium salt to provide a mixed metal laked pigment.

Metallization may be accomplished by adding the calcium salt to the dye after coupling of the diazonium component present is complete or, preferably by including about one equivalent of the calcium salt in the diazonium components whereby metallization occurs as the dye is formed (during coupling).

Optionally, one or more additives may be added to the red pigment/pigment composition, coupling reaction, and/or metallization reaction. For example, an antifoam agent, dispersant, filler, titanium oxide, zinc oxide, kaolin, and the like may be added.

In many applications, it is desirable although not required, in order to maximize the brightness and tinctorial strength, to heat the laked monoazo red pigment. For example, the laked monoazo red pigment may be heated to reflux temperature for a time from about 0.5 to about 5 hours at temperatures of about 100° C. or higher optionally under pressure in the presence or absence of the above described resin soaps or other soluble resins.

In some instances, use of certain surface active agents during metallization facilitates the subsequent formation of the laked monoazo red pigments having intermediate shades, strength, and heat stability. Examples of surface active agents include amine surfactants, and specifically amine oxide surfactants, cationic amine oxide surfactants, ethoxylated amine surfactants, sulfosuccinate surfactants, and derivatives thereof.

After completion of the reactions and optional heating, the laked monoazo red pigments are recovered from the water based reaction slurry by filtering to form a presscake of pigment which is washed with hot water (e.g., from about 40° C. to about 70° C.) so as to remove the excess acids, bases and unwanted salts formed during the coupling reaction. The presscake is typically washed with from about 10 to about 20 times its volume of water. The filter cake is generally washed until the filtrate gives only a slightly positive test for chloride ion. The washed presscakes can be dried, ground and used in the form of a coarse or finely divided powder. Alternatively, the laked monoazo red pigments of this invention can be dispersed into oleoresinous vehicles to prepare flushed bases or dispersed into aqueous or organic vehicles to prepare aqueous dispersions or organic pigment compositions.

The laked monoazo red pigment of the present invention comprises a compound represented by the following Formula I.

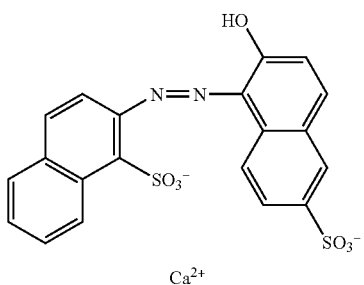

In another embodiment, the laked monoazo red pigment of the present invention consists essentially of the compound represented by Formula I (that is, an essentially pure laked monoazo red pigment represented by Formula I).

The laked monoazo red pigments, when made in accordance with the methods of the present invention, have unique characteristics such as a Hue Angle of less than 3° and an Apparent Strength K/S value of at least about 10. In another embodiment, the laked monoazo red pigments made in accordance with the present invention have a Hue Angle of less than about 2.5° and an Apparent Strength K/S value of at least about 12.5. In yet another embodiment, the laked monoazo red pigments made in accordance with the present invention have a Hue Angle of less than about 2° and an Apparent Strength K/S value of at least about 15. The Hue Angle and Apparent Strength K/S value are determined using 0.5 part pigment, 5.0 parts titanium dioxide, and 500 parts high density polyethylene in the Test Methods described below.

The present invention also relates to pigment compositions containing a major amount of the laked monoazo red pigment represented by Formula I and a minor amount of at least one of an amine surfactant and a sulfosuccinate surfactant. In another embodiment, the pigment compositions consist essentially of a major amount of the laked monoazo red pigment represented by Formula I and a minor amount of at least one of an amine surfactant and a sulfosuccinate surfactant (that is, an essentially pure mixture of the laked monoazo red pigment represented by Formula I and a surfactant). In other embodiments, pigment compositions containing a major amount of the laked monoazo red pigment represented by Formula I and minor amounts of supplemental pigments formed when using one or more supplemental aromatic amines and/or one or more supplemental aromatic sulfonic acid couplers, such pigment compositions optionally containing a surfactant.

The red pigments and pigment compositions of the present invention provide good color strength, resistance to polar solvents, light fastness and/or heat stability and are useful as coloring agents in plastics, coatings including powder coatings and paint compositions, inks, electrostatic toners, and papers. This invention, therefore, also relates to coating compositions, ink compositions, plastic compositions, electrostatic toner compositions, powder coating compositions, paint compositions, and paper compositions comprising major amounts of a coating vehicle, an ink vehicle, a plastic, an electrostatic toner, a powder coating vehicle, paint vehicle, and a paper vehicle, respectively, and minor amounts of the compositions of this invention. Major amounts include at least 50% by weight whereas minor amounts include less than 50% by weight.

Examples of various vehicles include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, rubber, and also filaments made of viscose and cellulose ethers, cellulose esters, polyamides, polyurethanes, polyesters, for example polyalkylene terephthalates, polycarbonates, polyimides, and polyacrylonitrile. It is also useful for pigment printing and for the pigmenting of paper in the mass.

Due to its excellent heat resistance, the pigment is particularly suitable for the pigmenting of plastics in the mass, such as, for example, of polystyrene and its mixed polymers, polyolefins, in particular polyethylene and polypropylene and the corresponding mixed polymers and copolymers, polyvinyl chloride and polyesters in particular polyethylene terephthalate and polybutylene terephthalate and the corresponding mixed condensation products based on polyesters, and mixtures and copolymers thereof.

Heat stability is the ability to resist decomposition at temperatures above about 350° F. In another embodiment, the laked monoazo red pigment of the present invention resists decomposition at temperatures above about 400° F. In yet another embodiment, the laked monoazo red pigment of the present invention resists decomposition at temperatures above about 450° F. In still yet another embodiment, the laked monoazo red pigment of the present invention resists decomposition at temperatures above about 500° F. In still another embodiment, the laked monoazo red pigment of the present invention resists decomposition at temperatures above about 550° F.

See, for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburgh (1994), particularly pages 63–288; and with regard to plastics: T. G. Webber, Coloring of Plastics, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants.

For example, the laked monoazo red pigment may be used at a level from about 10 to about 15% by weight in an offset lithographic ink, with the remainder being a vehicle containing gelled and ungelled hydrocarbon resins, alkyd resins, wax compounds and aliphatic solvent. The laked monoazo red pigment may also be used, for example, at a level from about 1 to about 10% by weight in an interior paint formulation along with other pigments which could include titanium dioxide, acrylic latices, coalescing agents, water or solvents. The laked monoazo red pigment may also be used, for example, at a level from about 20 to 30% by weight in a plastic color concentrate in polyethylene.

In one embodiment, the laked monoazo red pigment or the laked monoazo red pigment composition of the present invention does not contain chlorine. In another embodiment, the laked monoazo red pigment of the present invention contains one atom or less of chlorine per molecule of pigment. In this connection, the laked monoazo red pigments of the present invention are environmentally friendly.

The following examples illustrate the pigments and compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

A diazo slurry is prepared by dissolving 13.4 parts of 2-aminonaphtahlene-1-sulfonic acid in 140 parts of water and 4.8 parts of 50% sodium hydroxide solution. The solution is cooled to 0° C. by the addition of ice and diazotized by the addition of 17 parts of a 25% solution of sodium nitrite and 22 parts of 20 Baume hydrochloric acid and stirring the slurry at 5–10° C. for 40 minutes. Excess nitrite is quenched with sulfamic acid. A small amount of an antifoam agent is used to control the foam.

A coupler slurry is prepared by dissolving 15.4 parts of sodium salt of 2-hydroxy-naphthalene-6-sulfonic acid (Schaeffer's Salt) by heating in 500 parts of water containing 4.5 parts of 50% sodium hydroxide. The slurry is cooled to 20° C. with ice.

The diazo slurry is coupled into the coupler slurry over a period of 30 minutes while maintaining the pH at 6–8. The pH of the slurry is then raised to 9.8 by addition of 10 percent solution of sodium hydroxide followed by the addition of and 2.5 parts of bis(2-hydroxyethyl)cocamine oxide. The mixture is stirred 20 minutes, pH is adjusted to 8 and 22 parts calcium chloride are added. The slurry is stirred for 50 minutes and heated to boiling at a rate of approximately 1° C./minute and boiled for two hours. The slurry is then iced to lower than 50° C. and filtered; the filter cake is washed with water, dried overnight at 80° C. and pulverized to give a red pigment powder.

EXAMPLE 2

The procedure of Example 1 is repeated except that after addition of bis(2-hydroxyethyl)cocamine oxide, the pH is adjusted to 6.5 instead of 8 to give a red pigment powder.

EXAMPLE 3

The procedure of Example 1 is repeated except that after addition of bis(2-hydroxyethyl)cocamine oxide, the pH is adjusted to 5 instead of 8 to give a red pigment powder.

EXAMPLE 4

The procedure of Example 1 is repeated except that 2 parts of alkylamine-guanidine polyoxyethanol are added instead of 1.7 parts of bis(2-hydroxyethyl)cocamine oxide to give a red pigment powder.

EXAMPLE 5

The procedure of Example 4 is repeated except that after addition of alkylamine-guanidine polyoxyethanol, the pH is adjusted to 6.5 instead of 8 to give a red pigment powder.

COMPARATIVE EXAMPLE 1

The procedure of Example 1 is repeated except that bis(2-hydroxyethyl)cocamine oxide is not added to the reaction mixture to give a red pigment powder.

COMPARATIVE EXAMPLE 2

The procedure of Comparative Example 1 is repeated except that before the addition of calcium chloride, the pH is adjusted to 6.5 instead of 8 to give a red pigment powder.

Test Method I

The pigments of Examples 1 to 5 are compared to Comparative Examples 1 and 2 and Pigment Red 60:1, also known as Pigment Scarlet 225-2480 from Sun Chemical. A mixture of 0.5 part pigment (pigments of Examples 1 to 5 and Comparative Examples 1 to 3) but 1.5 parts pigment of Pigment Red 60:1, 5.0 parts titanium dioxide (DuPont Ti-Pure R-960) and 500 parts high density polyethylene (Solvay T50-2000-G) are shaken on a paint shaker to uniformity, then injection molded at 232° C. in a 30 ton Battenfield machine. Spectrophotometric values are measured with a Macbeth Color-Eye (specular component included, large area) to give the apparent strength and hue angle under Illuminant D, 10°, shown in the Table I.

TABLE I

| Pigment | Hue Angle | Apparent Strength (K/S) |
| --- | --- | --- |
| Example 1 | 2.15 | 17.27 (Standard) |
| Pigment Red 60:1 | 358.9 | 16.87 (2.3% weak) |
| Example 2 | 2.52 | 17.04 (1.3% weak) |
| Example 3 | 2.07 | 14.69 (15% weak) |
| Example 4 | 0.85 | 15.17 (12.2% weak) |
| Example 5 | 1.35 | 14.60 (15.5% weak) |
| Com Example 1 | 3.59 | 6.23 (63.9% weak) |
| Com Example 2 | 3.03 | 5.14 (70.3% weak) |

Hue Angle is evaluated based on a hue circle where 0°/360° corresponds to red, 90° corresponds to yellow, 180° corresponds to green, and 270° corresponds to blue. Hue Angles of pigments from Examples 1 to 5 are very close to 0°, which represents a stronger blue shade red than the Comparative Examples 1 and 2. K/S value measures the pigment strength of a pigment. The higher the K/S value, the stronger the pigment. The K/S value of the pigment of Example 1 at 0.5 parts pigment loading being slightly higher than the K/S value of Pigment Red 60:1 at 1.5 parts loading indicates that it is a markedly stronger pigment compared to the same amount of Pigment Red 60:1. Significantly higher K/S values of the pigments of Examples 1 to 5 compared to the pigments of Comparative Examples 1 and 2 indicate that use of an appropriate surfactant is needed to produce a strong red pigment.

Test Method 2

A plastic composition containing the red pigment of Example 1 and polyvinyl chloride is produced on a Stewart Bolling 2 Roll (6"×12") mill operating under the following conditions: Front Roll at 265° F. and 22.4 r.p.m.; Rear Roll at 245° F. and 34.2 r.p.m. Two parts of the red pigment from Example 1 and 0.5 part of titanium dioxide are weighed into a milling pot together with 500 parts plasticized PVC and hand stirred just prior to milling. The homogeneous blend is then banded on the front 2 Roll mill, nip is closed to approximately 0.007 inch and milled for 4 minutes using an end passing technique. After 4 minutes the nip is opened 0.037 inch, the batch is removed and cooled for 4 minutes. The nip is then closed to 0.007 inch and the cooled batch is fed through the nip which shreds the entire batch. The shredded material is fed back into the nip, allowed to band and then milled for 4 minutes by end passing technique. The nip is opened to 0.037 inch and the batch is removed. The cooled hide is then compression molded at 350° F. and 20,000 psi for 2 minutes, removed and cooled. Thus is obtained a strong blue shade red plastic composition which exhibits similar advantages as described in Table 1.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A red pigment composition comprising:
a major amount of a pigment represented by Formula I:

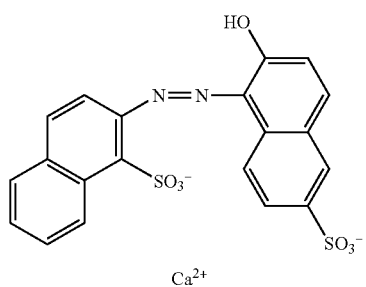

(I)

having a Hue Angle of less than 3° and an Apparent Strength K/S value of at least about 10.

2. The red pigment composition according to claim 1 consisting essentially of the pigment represented by Formula I.

3. The red pigment composition according to claim 1 having a Hue Angle of less than about 2.5° and an Apparent Strength K/S value of at least about 12.5.

4. The red pigment composition according to claim 1 further comprising a minor amount of at least one of an amine surfactant and a sulfosuccinate surfactant.

5. The red pigment composition according to claim 4, wherein the amine surfactant is at least one selected from the group consisting of amine oxide surfactants and ethoxylated amine surfactants.

6. The red pigment composition according to claim 4, wherein the amine surfactant is at least one selected from the group consisting of N,N-bis(2-hydroxyethyl)cocoalkylamine oxide, N,N-dimethylcocoalkylamine oxide, alkylamine-guanidine polyoxyethanol, dimethyl (hydrogenated tallow) amine oxide, dimethylhexadecylamine oxide, bis(2-hydroxyethyl)tallowamine oxide, coco amidopropyl amine oxide, lauryl (12,14,16 blend) dimethyl amine oxide, myristyl dimethyl amine oxide, cocamidopropylamine oxide, and stearyl dimethylamine oxide.

7. The red pigment composition according to claim 1 further comprising a minor amount of a supplemental pigment formed by coupling a diazotized supplemental aromatic amine with a supplemental naphthalene coupler and metallizing with calcium.

8. A method of making a red pigment composition comprising:
coupling a diazonium component comprising a compound prepared from an aromatic amine represented by Formula II

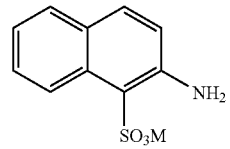

(II)

wherein M is any one of H, Li, Na, ½Mg, K, ½Ca, ½Sr, $NH_4$, $NR_{4-x}H_x$, wherein R is an alkyl or alkoxy group containing 1 to 4 carbon atoms and x is 0 to 3 with a coupling component comprising an aromatic sulfonic acid coupler represented by Formula III

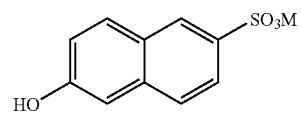

(III)

wherein M is any one of H, Li, Na, ½Mg, K, ½Ca, ½Sr, $NH_4$, $NR_{4-x}H_x$, wherein R is an alkyl or alkoxy group containing 1 to 4 carbon atoms and x is 0 to 3 at a pH of about 4 or more and about 9 or less; and
metallizing with a calcium salt, wherein at least one of the coupling and the metallizing is conducted in the presence of at least one of an amine surfactant and a sulfosuccinate surfactant.

9. The method according to claim 8, wherein the aromatic amine represented by Formula II comprises 2-aminonaphthalene-1-sulfonic acid and the aromatic sulfonic acid coupler represented by Formula III comprises a potassium salt of 2-hydroxynaphthalene-6-sulfonic acid.

10. The method according to claim 8, wherein at least the metalling is effected in the presence of the amine surfactant, and the amine surfactant is at least one selected from the group consisting of amine oxide surfactants and ethoxylated amine surfactants.

11. The method according to claim 8, wherein the diazonium component further comprises a minor amount of a supplemental compound prepared from at least one supplemental aromatic amine selected from the group consisting of 2-amino-5-methoxy-benzenesulfonic acid; 2-amino-5-ethoxy-benzenesulfonic acid; 2-amino-4-chloro-5-methoxy-benzenesulfonic acid; 2-amino-4-chloro-5-ethoxy-benzenesulfonic acid; 2-amino-4-methyl-5-methoxy-benzenesulfonic acid; 2-amino-4-ethyl-5-methoxy-benzenesulfonic acid; 2-amino- 4,5-dimethoxy-benzenesulfonic acid; 2-amino-4-methyl-5-ethoxybenzenesulfonic acid; 2-amino-4-ethyl-5-ethoxybenzenesulfonic acid; 2-amino-4,5-diethoxybenzenesulfonic acid; 2-aminobenzene-1-sulfonic acid; 4-aminobenzene-1-sulfonic acid; 2-amino-5-methylbenzene-1-sulfonic acid; 3-amino-6-methylbenzene-1-sulfonic acid; 2-amino-4-chloro-5-methylbenzene-1-sulfonic acid; 2-amino-5-chloro-4-ethylbenzene-1-sulfonic acid; 2-amino-5-chloro-4-methylbenzene-1-sulfonic acid; 3-aminobenzoic acid; 4-aminobenzoic acid; 2-amino-5-methylbenzoic acid; 2-amino-6-methylbenzoic acid; 3-amino-2-methylbenzoic acid; 2-amino-3-methoxybenzoic acid; 4-amino-3-methoxybenzoic acid; 4-amino-5-chloro-2-methoxybenzoic acid; 2-amino-4-chlorobenzoic acid; 3-amino-4-chlorobenzoic acid; 1-naphthyl amine; 2-naphthyl amine; 4-aminonaphthalene-1-sulfonic acid; 4-aminobiphenyl-3'-sulfonic acid; 4,4'-diaminobiphenyl-2,2'-disulfonic acid 2-methoxy-4-nitroaniline; 2-methoxy-5-nitroaniline; 4-methoxy-2-nitroaniline; 2-amino-4-chloro-5-nitrotoluene; 2-chloro-4-nitroaniline; 2-chloro-5-nitroaniline; 4-chloro-2-nitroaniline; 4-chloro-3-nitroaniline; 5-chloro-2-nitroaniline; 5-chloro-2-methyl-4-nitroaniline; 2-chloro-4-methylaniline; 2-chloro-5-methylaniline; 2-chloro-6-methylaniline; 3-chloro-2-methylaniline; 3-chloro-4-methylaniline; 4-chloro-2-methylaniline; 5-chloro-2-methylaniline; 4-chloro-2-methoxy-5-methylaniline; 4-chloro-2,6-dinitroaniline; 6-chloro-2,4-dinitroaniline; 2-chloro-4,6-dimethylaniline; 3-chloro-2,6-diethylaniline; 4-chloro-2,6-dibromoaniline; 2-chloroaniline; 3-chloroaniline; 4-chloroaniline; 5-chloro-2-methoxyaniline; 3-chloro-4-methoxyaniline; and aniline.

12. The method according to claim 8, wherein the coupling component further comprises a minor amount of at least one supplemental naphthalene coupler selected from the group consisting of naphthalene; naphthalene-1-sulfonic acid; naphthalene-1,3-disulfonic acid; naphthalene-2-sulfonic acid; 2-naphthoic acid; 2-naphthol; 3-naphthol; 1-naphthoic acid; 1-hydroxynaphthalene-2,7-disulfonic acid; 3-hydroxynaphthalene-1-sulfonic acid; 2-hydroxynaphthalene-1-sulfonic acid; 5-hydroxynaphthalene-1-sulfonic acid; 1-hydroxynaphthalene-3-sulfonic acid; 1-nitronaphthalene; and 1-chloronaphthalene.

13. The method according to claim 8, wherein coupling is effected in the presence of the amine surfactant at a pH of about 5 or more and about 8 or less.

14. The method according to claim 8, wherein coupling is effected in the presence of the amine surfactant, and the amine surfactant is at least one selected from the group consisting of amine oxide surfactants and ethoxylated amine surfactants at a pH of about 5 or more and about 8 or less.

15. A plastic composition comprising a major amount of a plastic and a minor amount of the red pigment according to claim 1.

16. The plastic composition according to claim 15, wherein the plastic comprises at least one selected from the group consisting of polystyrene, polyolefins, polyacrylic compounds, polyvinyl compounds, polyesters, filaments made of viscose and cellulose ethers, cellulose esters, polyamides, polyurethanes, polycarbonates, polyimides, and polyacrylonitrile.

17. A plastic composition comprising a major amount of a plastic and a minor amount of the red pigment composition made according to claim 8.

18. The plastic composition according to claim 17, wherein the plastic comprises at least one selected from the group consisting of polystyrene, polyolefins, polyacrylic compounds, polyvinyl compounds, polyesters, filaments made of viscose and cellulose ethers, cellulose esters, polyamides, polyurethanes, polycarbonates, polyimides, and polyacrylonitrile.

19. A coating composition comprising a major amount of a coating vehicle and a minor amount of the red pigment according to claim 1.

20. A coating composition comprising a major amount of a coating vehicle and a minor amount of the red pigment composition made according to claim 9.

21. An ink composition comprising a major amount of an ink vehicle and a minor amount of the red pigment according to claim 1.

22. An ink composition comprising a major amount of an ink vehicle and a minor amount of the red pigment composition made according to claim 9.

23. An electrostatic toner composition comprising a major amount of an electrostatic toner and a minor amount of the red pigment according to claim 1.

24. An electrostatic toner composition comprising a major amount of an electrostatic toner and a minor amount of the red pigment composition made according to claim 9.

* * * * *